United States Patent [19]
Loga et al.

[11] Patent Number: 5,088,257
[45] Date of Patent: Feb. 18, 1992

[54] ACCESSORY WINDOW SEAL ASSEMBLY

[75] Inventors: Thomas H. Loga; Ronald D. Biggerstaff, both of Houston, Tex.

[73] Assignee: Dresser Industries, Inc., Dallas, Tex.

[21] Appl. No.: 580,115

[22] Filed: Sep. 10, 1990

[51] Int. Cl.⁵ .............................. G01D 11/26
[52] U.S. Cl. ................................ 52/397; 73/431; 116/305
[58] Field of Search ............ 52/397, 208; 73/431, 73/866.3; 116/305; 49/489

[56] References Cited
U.S. PATENT DOCUMENTS

| | | | |
|---|---|---|---|
| 1,745,016 | 6/1928 | Jorss | 49/489 |
| 4,033,191 | 7/1977 | Kreuz et al. | 73/431 |
| 4,828,274 | 5/1989 | Stannard | 49/489 |

OTHER PUBLICATIONS

Drawing D049848-001 in "Roots Meters" brochure; p. 8.

Primary Examiner—David A. Scherbel
Assistant Examiner—Robert Canfield
Attorney, Agent, or Firm—Hubbard, Thurman, Tucker & Harris

[57] ABSTRACT

An improved seal assembly provides a mechanical seal for a housing having a window panel of dissimilar material which prevents moisture from entering the housing or liquid escaping the housing over a wide range of temperature and environmental conditions, without loading the window panel to a stressful condition. The seal member is subject to a reduced level of radial force in a limited portion of the seal member across the seal groove and does not have to be pressed from all sides to maintain a seal while accommodating expansion and contraction. Positioning means stabilizes the panel to provide a uniform seal groove.

23 Claims, 4 Drawing Sheets

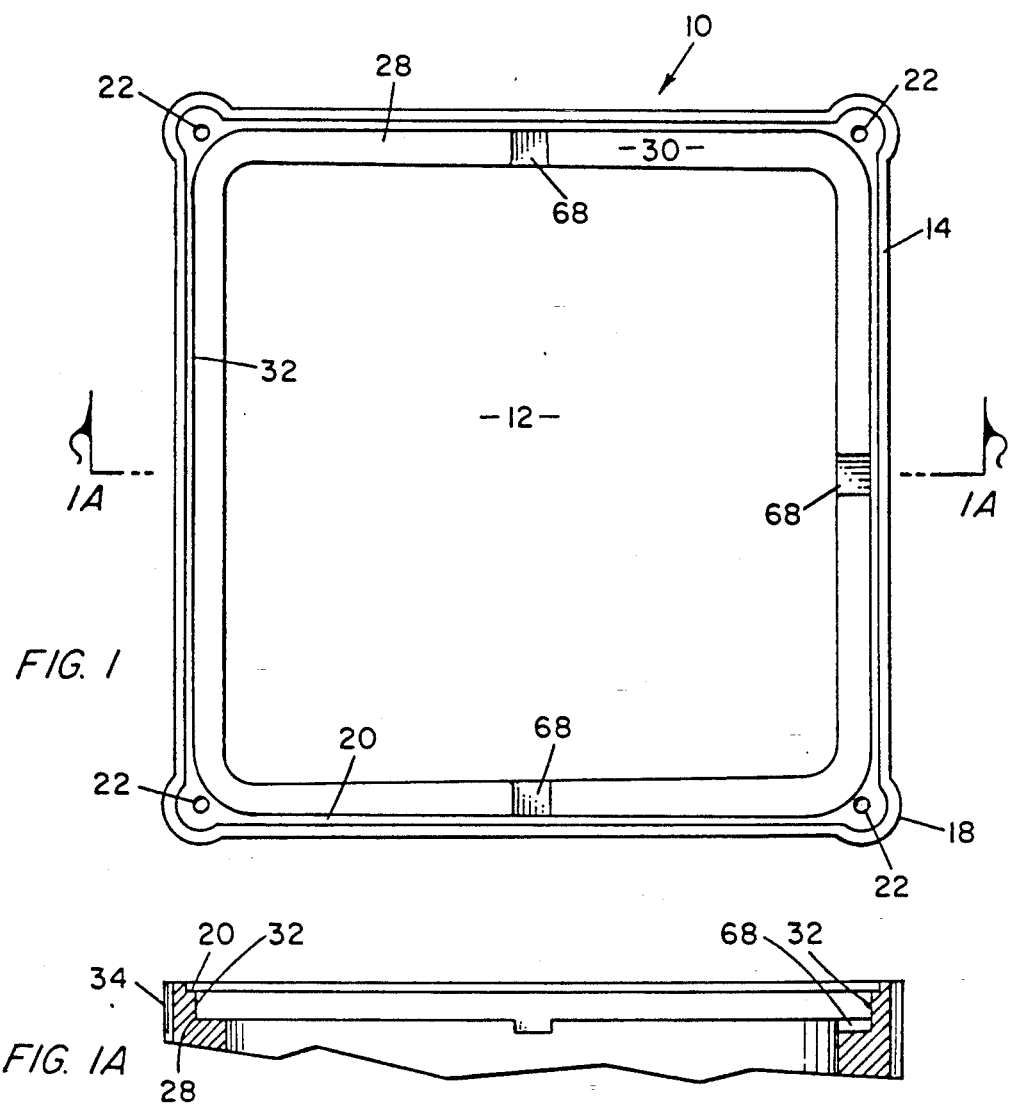
FIG. 1
FIG. 1A
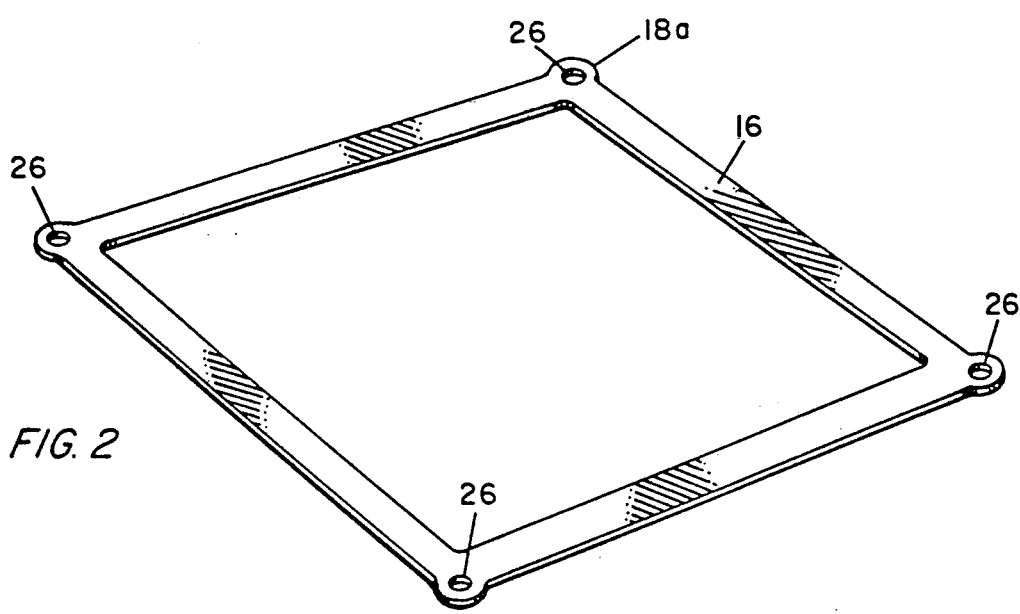
FIG. 2

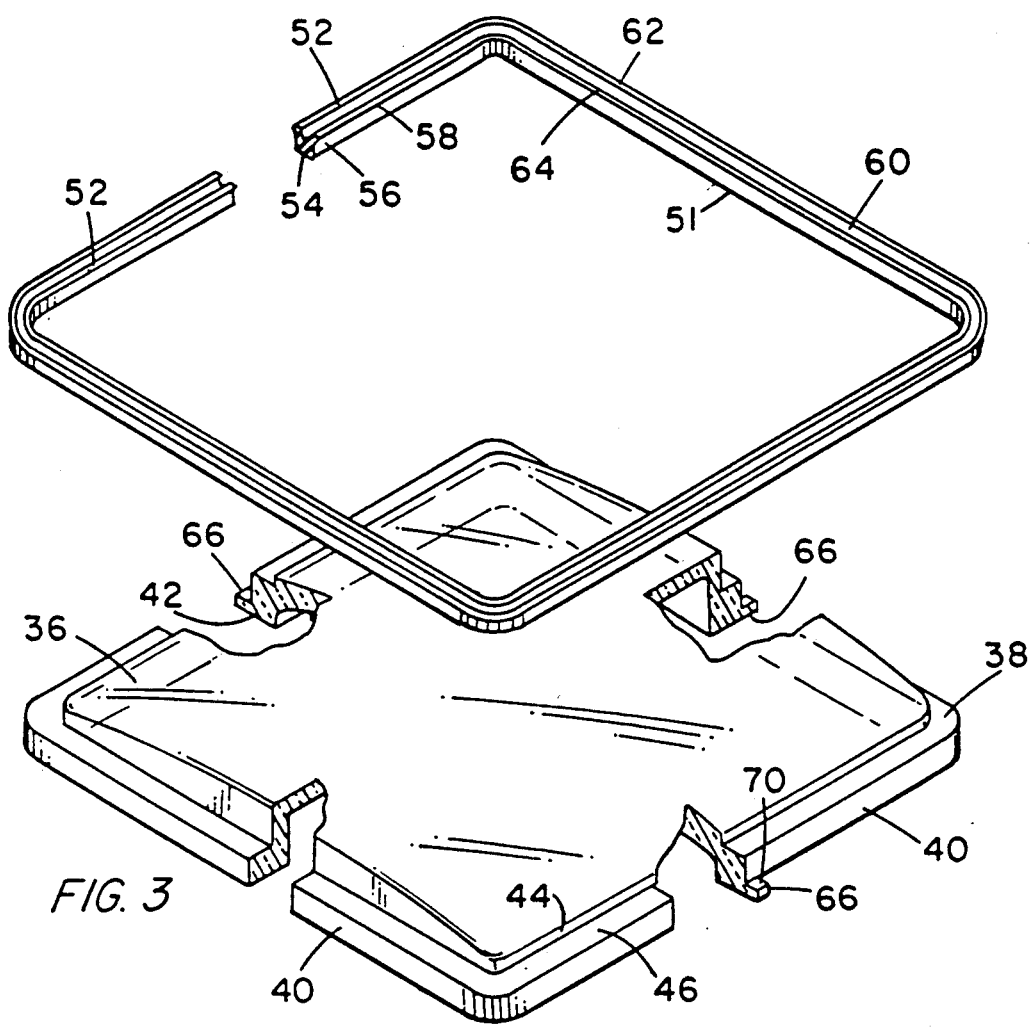
FIG. 4
FIG. 3
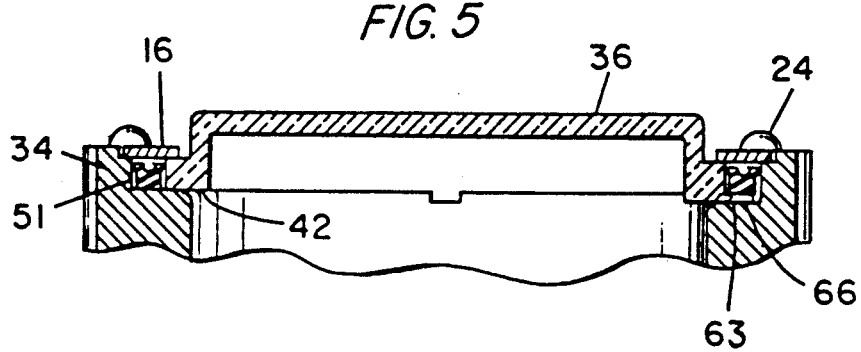
FIG. 5

ACCESSORY WINDOW SEAL ASSEMBLY

BACKGROUND OF THE INVENTION

I. Field Of The Invention

The invention relates to an improved sealing assembly for a window in gauges, meters and other accessories over a wide range of temperature and environmental conditions.

II. Description Of The Prior Art

Many types of accessory equipment, such as gauges and meters are exposed to a variety of external conditions which are detrimental to the operation of the device. Devices of this type necessarily include a housing for the works of the device to which is secured a window through which the status of the gauge can be read by an operator. In particular, natural gas meters must have a window through which the utility company or supplier can determine the meter reading periodically in order to determine the correct amount used. Gas meters are normally located outside of dwellings and so must withstand the ravages of temperature from winter to summer. The seal assembly must secure the internal components from moisture, and in the case of natural gas meters, prevent oil contained in the unit from escaping and leading to a stopped meter or inaccurate readings. The gas meters are usually unpressurized meters.

Such meters may have a housing with a observers window oriented in a horizontal position or they may be installed with the observers window oriented in a vertical position, or in some cases devices having windows may be moved to a variety of positions which exacerbates the problem of containing internal fluids necessary for the operation of the device.

It has been common to utilize a form of O-ring in a ring retaining groove located around the face of the gauge or meter between a housing and the edge of a window member to provide a seal therebetween. This requires compression of the O-ring between the upper and/or lower portions to bulge the O-ring out into an oval-shape to secure the required seal between the housing and the window member. The O-ring often must be made of stout material in order to survive for an extended period of time. It must resist deformation in order to provide an adequate seal. The resistance to deformation generates substantial forces in a radial direction of the edges of the window or cover which tends to either require excessive thicknesses of window material to withstand the forces generated or using a lesser compression of the seal member and risk losing the seal over time.

In recent years such windows are made from polycarbonate material which has a tendency to craze or crack over time when exposed to excessive stress. Compounding the problem is the differential rate of expansion and contraction of the metallic members and the plastic cover window which can become significant over a temperature range of approximately −40° F. (−40° C.) to +140° F. (+59.4° C.) over an extended period of time. In addition, O-rings are difficult to install in this kind of device.

The present invention provides an improved seal structure to maintain an external and internal seal over an extended period of time and range of temperature variation while at the same time producing only a very limited stress in a window which is sealed in a housing. Essentially only axial or radial forces are involved in creating the seal with expansion and contraction being provided for by the seal itself. The seal is easy to install and does not require high vertical compressive forces to effectuate a sufficient seal.

SUMMARY OF THE INVENTION

The invention is an improved accessory window seal assembly for a gas meter or gauge or similar device. The invention is particularly useful in gas meters which are expected to last 15 to 20 years in an environmental exposure which ranges in design temperature from −40° F. (−40° C.) to 140° F. (+59.4° C.) and are usually located on the exterior of buildings. The meters referred to are not usually intentionally pressurized by the pressure of the natural gas itself. The assembly provides a long lasting seal which accommodates thermal expansion and contraction between different materials comprising the meter and maintains a seal without loading the observing window panel which is located on the face of the gauge.

The improved window seal assembly has a housing having a face for supporting a window panel covering an internal area of the housing, the face having a sealing surface circumscribing the internal area to be enclosed. The window panel is mounted in the face of the housing having a window panel sealing surface spaced apart from the sealing surface of the housing, to form a sealing groove therebetween. Included are means for positioning the panel with respect to the face of the housing so that the sealing groove is uniform. A seal member seals the groove, the seal member including a heel portion narrower than the groove and a radially or axially compressible seal portion stressed in only the cross direction, across the sealing groove, to form the seal between the sealing surfaces. The radially compressible seal portion of the seal member comprise opposed flared eared ridges angled outwardly from the heel portion.

The housing has a ledge for supporting the edge of the window panel, the ledge having a supporting surface and a sealing surface. The peripheral edge of a window panel is sized for support by the ledge with the spaced apart sealing surface of the edge of the window panel and the sealing surface of the ledge forming the seal groove, the bottom of the ledge forming a support surface for the heel portion of the seal member when the seal is placed in position to seal between the housing and the window. The window includes positioning means which cooperate with locating means in the ledge of the housing to stabilize the window panel on the supporting ledge in a position which creates the uniform seal groove. The positioning means may comprise a plurality of extended tabs and the locating means may comprise a corresponding plurality of recesses.

Once the window panel is stabilized in the centered and correct position in the face of the housing, the special seal member is installed and subject only to axial or radial forces in only a limited portion of the seal member without being compressed in another direction. The plurality of extended tabs in cooperating recesses lie under the seal member in assembly, in partial support thereof. The assembly further includes a retaining means which is a frame member which covers the seal groove and secures the window panel to the housing. The seal member is compressed between the opposed sealing surfaces of the window and the ledge without being compressed between the supporting surface for the seal member and the frame.

DESCRIPTION OF THE DRAWINGS

FIG. 1 is a plan view of the housing;
FIG. 1A is a cross-section on line 1A;
FIG. 2 is a perspective view of the frame member;
FIG. 3 is a perspective view of the covering window;
FIG. 4 is a perspective view of the seal member showing its cross-section;
FIG. 5 shows the housing, frame, window and seal member in assembly.

DESCRIPTION OF THE PREFERRED EMBODIMENT

Figure 6:
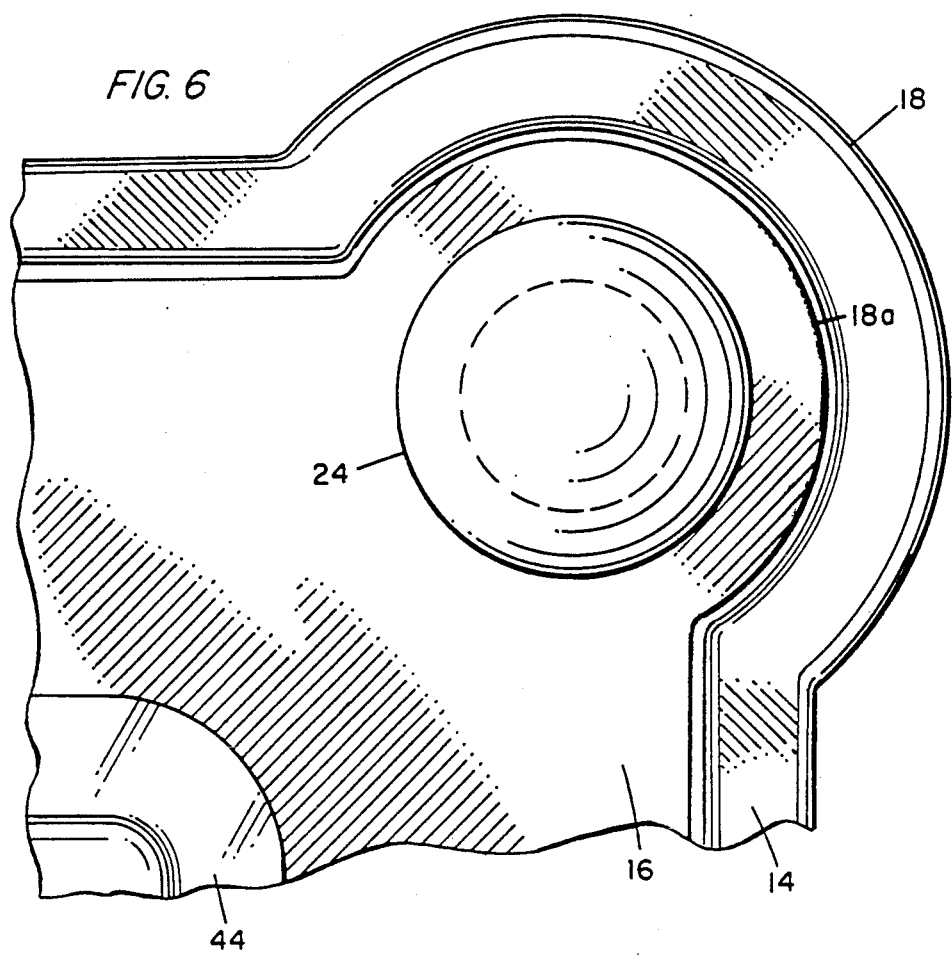
FIG. 6 is an expanded plan view of a corner assembly.

In FIG. 1 is a view of a gas meter housing generally designated by the reference numeral 10. Housing 10 has a central area 12 to be enclosed. The central area extends in a depth dimension towards the back of the housing which encloses the mechanical workings of the meter or gauge which are to be protected by a sealed window in the face of the gauge. The face of the gauge is bordered by a rim 14 of the housing which is a slightly raised continuation of the side walls of the housing which terminate at the face of the meter.

Rim 14 is shaped to receive a frame which in assembly will surround a window to cover the central opening area 12 when in place. Frame 16 is seen in FIG. 2. Both rim 14 and frame 16 have four ear portions 18, 18a which cooperate to hold the frame in position on a shelf 20 which runs around the periphery of the housing inside the rim 14 and lies in a flat plane to accept the flat frame 16. Each of the ear portions 18 have threaded openings 22 in the housing to receive threaded fasteners 24 which pass through openings 26 in the extreme outside ears of the frame. Thus it is seen that frame 16 is designed to be placed on the face of the housing supported by the shelf and secured by four fasteners at the ears. As will be seen later, the frame actually secures a window panel in place.

Figure 7:
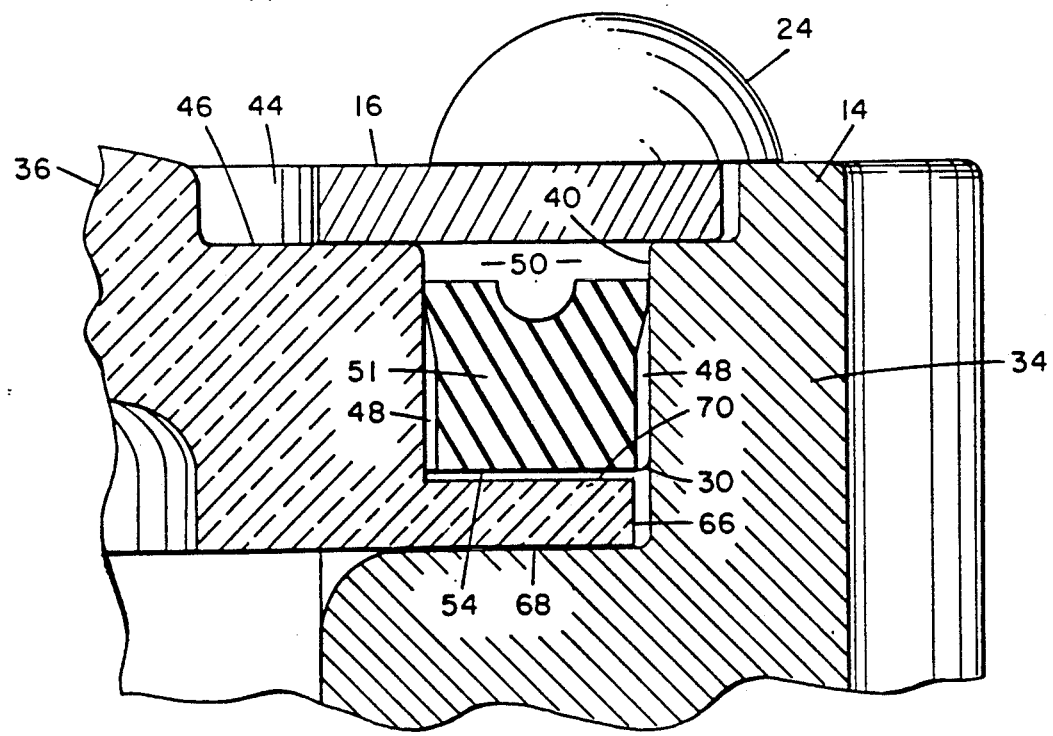
FIG. 7 is an expanded section of the seal assembly in an area having a tab and cooperating recess to position and locate the window.

A ledge 28 extends around the periphery of the face of the meter or gauge surrounding the area to be enclosed 12. Ledge 28 has a supporting surface 30 and a sealing surface 32 at right angles to each other in the uppermost portion 34 of the periphery of the housing. Sealing surface 32 is vertically oriented in relation to the flat horizontal plane which may be thought of as passing across the top surface of the rim 14 of the face of the housing. Sealing surface 32 is at right angles to the shelf 20 in FIG. 1A which is designed to receive and support the frame 16. These features are best seen in FIGS. 7 and 8.

A window panel 36 seen in FIG. 3 is defined by a peripheral edge 38 having a sealing surface 40 all around the peripheral edge. In assembly, the sealing surface 40 is intended to be in vertical orientation spaced apart from vertically oriented sealing surface 32. Peripheral edge 40 of the window panel also includes support surface 42, the outermost portion of which is designed to fit in supporting contact with a portion of the supporting surface 30 as indicated in FIG. 8. The inwardly most extending portion of support surface 30 is in contact with the outermost extending portion of support surface 42 so that the window is supported in the proper position at the face of the meter above the enclosed area 12. Peripheral edge 40 also includes a notch 44 having a flat area 46 at the outermost portion of the window panel for receiving and supporting frame 16. Notch 44 is sized to leave a sufficient gap so that frame 16 resting on shelf 20 and flattened area 46 will not bind in notch 44 as a result of thermal expansion and contraction.

Figure 8:
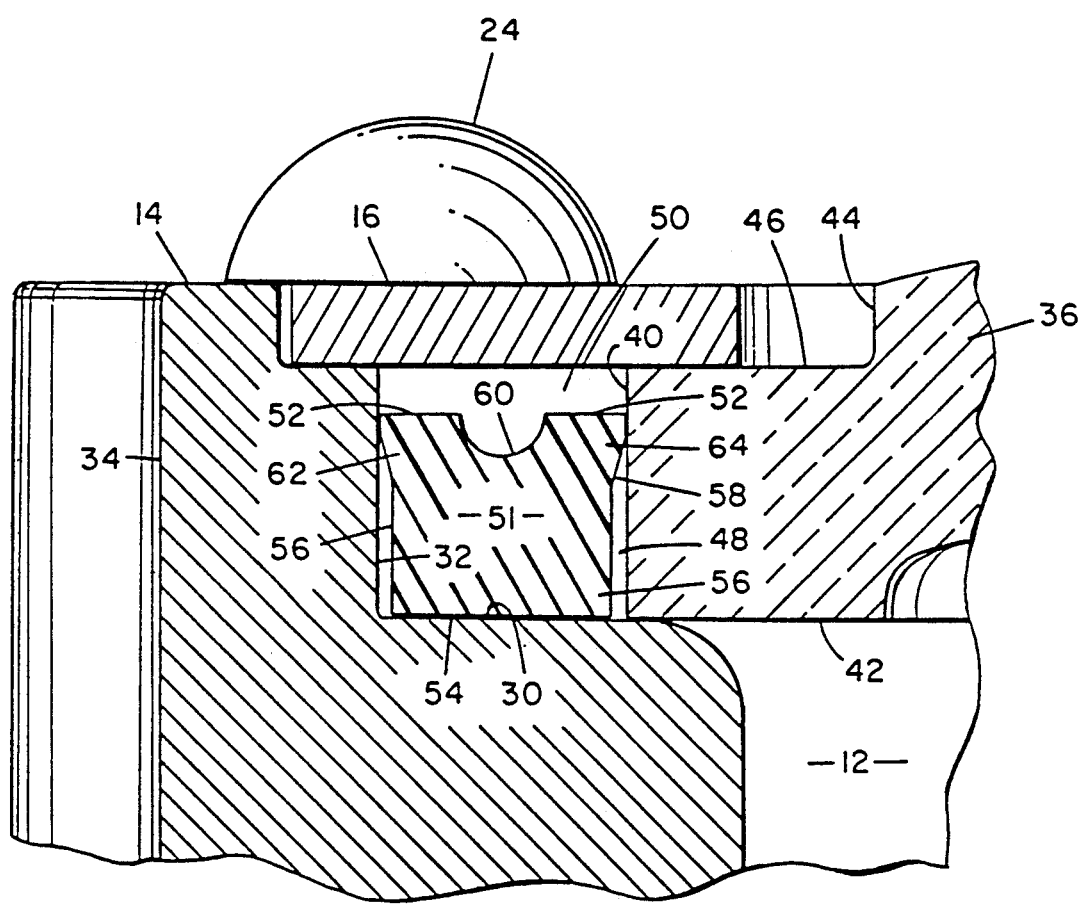
FIG. 8 is an expanded section of the seal assembly where there is no positioning tab.

It is seen from FIG. 8 that seal surface 32, seal surface 40 and supporting surface 30 form a seal groove 48 with the window panel 36 in position when the window is supported by the ledge. Sealing surfaces 32 and 40 are vertically oriented and spaced apart all around to create the seal groove 48. In assembly, the frame 16 covers seal groove 48 to create a seal enclosure 50. Enclosure 50 is defined by the surfaces 30, 32, 40 and the undersurface of frame 16.

A seal member 51 seen in FIG. 4 is adapted to seal in the seal groove 48. The seal member is constructed as a continuous seal having a pair of planar upper surfaces 52 and a planar undersurface 54. In assembly, seal member 51 fits in seal groove 48 supported by a major portion of ledge 28, with the lower surface 54 resting on supporting surface 30.

Seal member 51 has a heel portion 56 which has a square or rectangular cross-section having a width in cross-section less than the seal groove width and having a seal portion 58 above the heel which is wider than the seal groove. A relief area 60 is centered in the uppermost surface 52 of the seal member between opposed flared eared ridges 62 and 64 of seal portion 58, angled outwardly from the heel portion. It provides some relief so that the wider portions of the seal portion can be flexed or compressed inwardly to rest against sealing surfaces 32 and 40 without generating excessive radial or axial forces between the seal and the window, especially when thermal expansion occurs. This construction also provides for ease of assembling the seal member in the seal groove initially. Opposed ears 62 and 64 are flared outward at a transition from the heel portion 56 of the seal member to form the seal portion 58 of the seal. The heel portion does not seal even though it is more than half the total height of the seal member itself.

The seal member is designed so that it is subject only to radial or axial forces in the sealing portion, which forces may be viewed as being horizontally oriented with respect to the face of the meter, generally perpendicular to the sealing surfaces 32, 40. These radial or axial forces extend across the groove. For purposes of this disclosure, the term radial or axial force or forces refers to forces generally parallel to the face of the gauge but directed in a direction normal to the sealing surfaces 32, 40 which form seal groove 48. It is recognized that the term radial is probably more appropriate to a circular seal groove and seal and the term axial more appropriate to a square or rectangularly laid out seal groove and seal. However, the term radial is taken herein to mean either radial or axial, meaning directed perpendicularly against the seal across the seal groove.

The seal member is not subject to vertical compressive forces in a direction normal to the direction of the radial forces referred to because it is not subject to compression between the supporting surface 30 and the undersurface of frame 16. This is purposely done so to avoid generating a radial component to vertical compression force such as that which results from the use of a conventional O-ring. Compression of conventional O-rings generates excessive force between the housing and the window panel that can result in crazing or cracking of the panel, especially when it is subjected to extremes of temperature variation resulting from environmental conditions.

The heel portion of the seal member is purposely designed to leave an air gap between the sealing surfaces 32, 40 sufficient that thermal expansion within the design range will not result in compression of the heel by the window panel against the sealing surfaces which would result in generation of radial forces on the window panel. Thus the seal is provided between the housing and the window panel only by the seal portion 58 of the seal member 51, the flared ears 62 and 64 being only a small portion of the seal member in contact between the sealing surfaces of the housing and the window panel. Seal portion 58 is relatively easily flexed to maintain a seal in spite of thermal expansion and contraction resulting from cold winters and hot summers without putting a potentially damaging load on the window. FIG. 5 shows a cross-section through the completed assembly at a location where one of the locating recesses and positioning tabs are found, showing the relationship between the tab and the seal member.

FIG. 7 is a cross-section taken through one of the recesses 68 and tabs 66 of the completed assembly. Best seen in FIG. 3 and FIG. 7, the window panel includes several tabs 66, preferably integral thereto, which extend below the support surface 42 of the window panel and extend outwardly beyond the peripheral edge 38. They provide a means for positioning the peripheral edge with respect to the supporting ledge to facilitate installation of the seal member. Provided in ledge 28 of housing 10 are recesses 68 for receiving the extended tabs 66, and they constitute a means for locating the positioning means 66 of the window panel on the supporting ledge in a position which creates a uniform seal groove. The recesses and tabs also provide a means for correctly orienting the window panel with respect to the face of the housing, which may be important if the housing is of an irregular shape. It is seen that the extended tabs 66 have an upper surface 70, which in installation, lie under the seal member at an elevation which is consistent with the elevation of the supporting surface 30 in partial support of seal member 51. Care is taken in sizing the tabs and recesses to provide for thermal expansion and contraction without binding the tabs in the recesses or causing the ends of the tabs to bind against the ends of the recesses which would produce undesirable stresses across the face of the housing between the housing and the window panel.

The tabs and recesses stabilize the window panel on the supporting ledge in a position which creates a uniform seal groove to facilitate installation of the seal member. This would also be important in the event the meter must be open for repair so that the window is properly centered over the opening to be enclosed for re-installation or replacement of the seal. It is to be understood that the flared seal portion of the seal 51 is wider than the seal groove and compressed by radial force, stressed in only the cross direction, across the sealing groove, to form the seal between said sealing surfaces.

In operation, the housing is typically an aluminum die casting and the window is preferably a polycarbonate plastic material, such as LEXAN ® sold by General Electric Company. The polycarbonate might be expected to have a coefficient of expansion on the order of $4 \times 10^{-5}$ inch per inch per degree fahrenheit while the aluminum may be expected to have a coefficient of expansion of about $12 \times 10^{-6}$ inch per inch per degree fahrenheit, thus there is a substantial difference in expansion over a temperature range of $-40°$ F. $(-40°$ C.) to $+140°$ F. $(+59.4°$ C.) which are typical design criteria for gas meters. The seals for the face of such a meter are very important, not only to keep external moisture or contamination from entering the meter itself, but also to retain fluids that are commonly contained in gas meters to lubricate the parts or resist corrosion. They are typically exposed to ambient conditions and are expected to have at least a 15 to 20 year life. These conditions require a seal which retains its sealing characteristics and resists ultraviolet radiation. In this regard, the frame covers the seal and protects it from ultraviolet radiation contained in sunlight.

A soft Buna-N seal of approximately 60 to 70 durometer as commonly determined by seal manufacturers, has been considered desirable for use as the seal of the invention. The seal material should resist oil and moisture and retain flexibility over a long life, with good ultraviolet radiation resistance. A satisfactory seal may have a heel width slightly greater than the overall height. The seal does not require the use of a separate "gland" in the assembly of the invention and it should not be subject to vertical compressive forces of the type that would commonly be employed when using conventional O-rings. The frame is typically stainless steel.

In assembly, the window cover panel is first placed in position on the ledge, utilizing the means for positioning and locating the window in the correct orientation and position so as to provide a uniform seal groove. This facilitates installation of the seal. The seal is preferably, by means of a jig or fixture, pressed into the seal groove in a single operation. This is fairly easy to accomplish because the heel of the seal, which may include over half of its height, is narrower than the seal groove and thus does not contribute to resistance during installation.

Naturally, the flared upper portion of the seal member is compressed as it is installed into the seal groove, aided by the relief portion of the seal member. Once the seal member is in place as indicated in FIG. 8, it will generally stay in place without the necessity of being held down against the supporting surface 30. In fact, the seal will actually hold the cover in place without the frame, due to the radial forces between the window, the seal and the housing. The assembly is completed by placing the frame in position and securing it at the four corners or ears by means of the fasteners. It may be desirable to fill the excess space in the seal enclosure between the top of the seal and the bottom of the frame with an impervious material, simply to occupy the space and prevent the possibility of freeze damage by accumulation of water which accumulates under the frame.

The seal assembly of the invention provides a complete seal that is easy to install. It maintains its sealing characteristics over long periods of time from external and internal leakage, without loading the polycarbonate window enough to induce stresses in the window which may result in crazing or cracking. The assembly is able to accommodate substantial thermal expansion and contraction and at the same time maintain the positive seal required.

I claim:

1. An improved window seal assembly comprising:

a housing having a ledge for supporting the edge of a window panel, the ledge having a supporting surface and a sealing surface which surround a central area to be enclosed by the housing and a window panel;

a window panel defined by a peripheral edge having a sealing surface, being adapted to be supported around the peripheral edge by said ledge with the sealing surface of the window spaced apart from the sealing surface of the ledge to form a seal groove when said window is supported by said ledge; and a seal member adapted to seal said groove.

2. The assembly of claim 1 wherein the seal member has a heel portion with a width less than the seal groove width and a seal portion that width is wider than the seal groove width.

3. The assembly of claim 1 wherein the seal member is shaped to fit in said seal groove subject to radial compression between said sealing surfaces to form said seal.

4. The assembly of claim 1 wherein the seal member is shaped to fit in said seal groove in assembly, to seal by being compressed between the opposed sealing surfaces of the window and the ledge without being compressed between the supporting surface and a frame.

5. The assembly of claim 1 wherein the window panel includes means for positioning the peripheral edge with respect to the supporting ledge to facilitate installation of the seal member.

6. The assembly of claim 5 wherein the housing includes means for locating the positioning means, cooperating with said positioning means to stabilize the window panel on the supporting ledge in a position which creates a uniform seal groove.

7. The assembly of claim 5 wherein the means for positioning the window panel's peripheral edge with respect to the ledge comprises a plurality of extended tabs.

8. The assembly of claim 7 wherein the means for positioning the plurality of extended tabs which comprise the positioning means, is a corresponding plurality of recesses in the housing which cooperate with the extended tabs to stabilize the window panel on the supporting ledge in a position which creates a uniform seal groove to facilitate installation of the seal member.

9. The assembly of claim 8 wherein the seal member has a heel portion with a width less than the seal groove width and a seal portion that width is wider than the seal groove width.

10. The assembly of claim 8 wherein the seal member is shaped to fit in said seal groove subject to radial compression between said sealing surfaces to form said seal.

11. The assembly of claim 8 wherein the seal member is shaped to fit in said seal groove in assembly, to seal by being compressed between the opposed sealing surfaces of the window and the ledge without being compressed between the supporting surface and a frame.

12. The assembly of claim 11 wherein the plurality of extended tabs and cooperating recesses lie under the seal member in assembly.

13. The assembly of claim 12 further including a means for retaining in assembly, the seal member in the seal groove and the window panel in its located position with the peripheral edge of said panel being supported by said ledge.

14. The assembly of claim 13 wherein the means for retaining is a frame member which covers the seal groove and secures the window panel to the housing.

15. An improved window seal assembly comprising:

a housing having a face for supporting a window panel covering an internal area of the housing, the face having a sealing surface circumscribing the internal area to be enclosed;

a window panel mounted in the face of the housing, having a window panel sealing surface spaced apart from the sealing surface of the housing to form a sealing groove therebetween; means for positioning the panel with respect to the face of the housing so that the sealing groove is uniform; and a seal member sealing the groove, the seal member including a heel portion narrower than the groove and a radially compressible seal portion stressed in only the cross direction, across the sealing groove, to form the seal between said sealing surfaces.

16. The assembly of claim 15 wherein the radially compressible seal portion of the seal ember comprise opposed flared eared ridges angled outwardly from the heel portion.

17. The assembly of claim 16 wherein the seal member has a relief groove between the opposed flared eared ridges.

18. The assembly of claim 15 wherein the means for positioning the panel includes a plurality of extended tabs, extending beyond the sealing surface of the panel toward the sealing surface of the housing, under the seal member.

19. The assembly of claim 18 wherein the plurality of extended tabs for positioning the window panel cooperate with a corresponding plurality of recesses in the housing to stabilize the window panel in centered position.

20. The assembly of claim 15 further including a frame for the face of the housing to cover the seal groove and secure the window panel in place.

21. The assembly of claim 17 further including a frame for the face of the housing to cover the seal groove and secure the window panel in place.

22. The assembly of claim 18 further including a frame for the face of the housing to cover the seal groove and secure the window panel in place.

23. The assembly of claim 19 further including a frame for the face of the housing to cover the seal groove and secure the window panel in place.

* * * * *